Patented June 12, 1923.

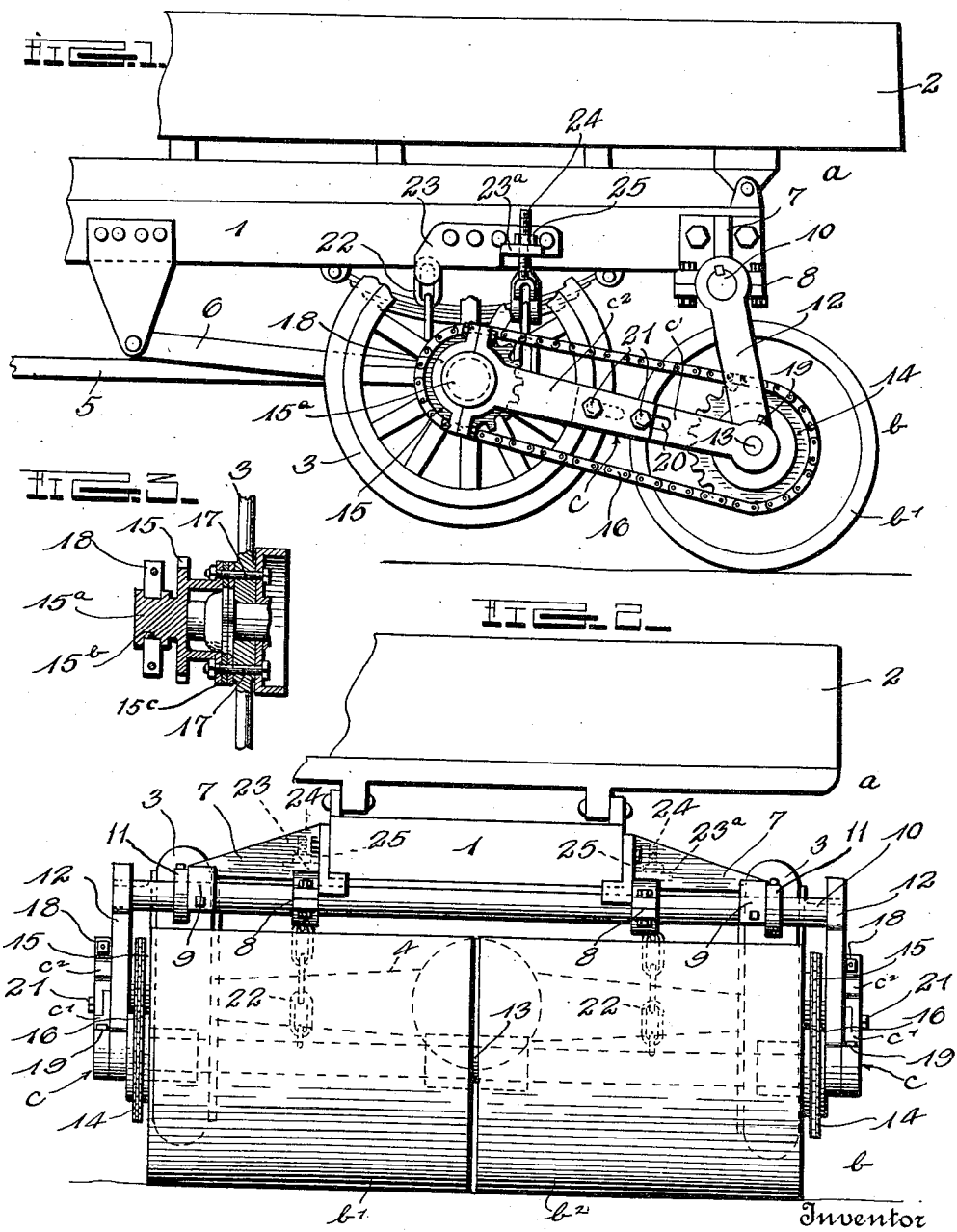

1,458,751

UNITED STATES PATENT OFFICE.

WILLIAM H. GAILOR, OF SARATOGA SPRINGS, NEW YORK.

ROLLER ATTACHMENT FOR POWER-DRIVEN MACHINES.

Application filed November 29, 1921. Serial No. 518,737.

*To all whom it may concern:*

Be it known that I, WILLIAM H. GAILOR, a citizen of the United States, residing at Saratoga Springs, in the county of Saratoga and State of New York, have invented certain new and useful Improvements in Roller Attachments for Power-Driven Machines, of which the following is a specification.

The purpose of the present invention is to provide a roller attachment which can be applied to a motor driven truck or other commercial vehicle and operated by the power of the motor on the vehicle, to roll roads, land or lawns.

In carrying out the invention, I connect the roller to the rear end of the vehicle in such manner that the roller will support said rear end, with the traction wheels of the vehicle raised from the ground, and I provide driving connections between the traction wheels of the vehicle and the roller, whereby when the motor is operated the power of the motor will be transmitted from the traction wheels to the roller, which then serves as a traction wheel to drive the vehicle. As the weight of the rear part of the vehicle rests upon the roller, the pressure of the latter upon the roadway or lawn may be increased as desired by loading the vehicle more or less.

In the accompanying drawing,

Fig. 1 is a side elevation of the rear portion of a power driven vehicle having my improvements thereon;

Fig. 2 is a rear end elevation of the same, partly broken away; and,

Fig. 3 is a sectional detail of one of the sprocket wheel attachments for the traction wheels.

Referring to the drawing, $a$ represents a motor operated truck, comprising the chassis frame 1, body 2, and rear or traction wheels 3. The rear axle housing is indicated at 4, the propeller shaft at 5, and 6 represents one of the radius rods connecting the rear axle housing with the frame.

Upon the rear ends of the side bars of the chassis frame, I provide laterally extending brackets 7, each having bearings 8 and 9 for a shaft 10. Collars 11, secured to the shaft adjacent the outer bearings 9, prevent endwise movement of the shaft. Links 12 are secured at their ends to the shaft 10 and to the shaft 13 of the roller $b$. The roller is shown in two sections, $b'$ and $b^2$, which are independently revoluble on the shaft 13, and each section is provided with a sprocket wheel 14, rigidly secured to it in any suitable manner. Upon each traction wheel of the vehicle is bolted a sprocket wheel 15, and driving chains 16 extend around the sprocket wheels on the traction wheels and on the roller sections. The sprocket wheels 15 are provided with flanges $15^c$, by which they may be bolted to the traction wheels by the same bolts 17 which connect the wheel hubs to the spokes, and said sprocket wheels are provided with outwardly extending hubs $15^a$ to which draw bars $c$ are connected. As shown, each draw bar has a split bearing 18 at one end fitting within a recess $15^b$ in the sprocket wheel hub, and the opposite end of the draw bar has an opening to receive the shaft 13 of the roller to which the draw bar is secured by a set screw 19. Each draw bar is made in two parts, $c'$ and $c^2$, the former provided with longitudinal slots 20, and the latter provided with bolts 21 which extend through said slots, the arrangement being such that the draw bar may be lengthened or shortened by moving one part with respect to the other and then tightening the bolts. This adjustment is provided in order to take up the slack in the drive chains as the chains and sprockets wear. As will be noted from the drawing, when the roller attachment is applied to the vehicle, the roller supports the rear end of the vehicle and also serves as a traction means, the traction wheels of the vehicle being raised from the ground. In order to support the rear axle and traction wheels, I provide at each side of the chassis frame a sling 22, which extends beneath the rear axle housing and is connected at one end to a bracket 23 and at its opposite end to a threaded bolt 24, which extends through a right angle projection $23^a$ on said bracket. The bolt is provided with a nut 25 by which the bolt may be raised or lowered to tighten or loosen the sling. These slings sustain the weight of the axle when the rear of the vehicle is supported by the roller.

When the parts are connected as shown in the drawing, it will be evident that the power transmitted to the driving wheels of the vehicle from the engine will be transmitted from said wheels to the roller. When the roller is driven in one direction or the other, the vehicle will be pulled or pushed by the roller through the medium of the draw bars.

The attachment may be applied to light or heavy commercial vehicles, according to the work to be performed, and the weight on the roller may be varied by varying the load on the vehicle. In many cases, for repair work on roads, a vehicle equipped with this attachment may be used instead of a regular road roller. For operating on lawns, the attachment is desirable since the vehicle wheels are raised from the ground and cannot score the lawn.

What I claim is:

1. The combination with a motor vehicle having a chassis frame, a rear axle and traction wheels, of a roller at the rear of said wheels and having a shaft, links suitably connected to the chassis frame and to said shaft and adapted to support the frame, drawbars connecting said axle with said shaft, driving connections between said axle and shaft, and means for supporting said traction wheels from the chassis frame.

2. The combination with a motor vehicle having a chassis frame, a rear axle and traction wheels, of a shaft extending transversely of said frame at the rear of said wheels, a road roller having a shaft, links connecting said shafts and adapted to support said frame, drawbars connecting the road roller shaft with the hubs of the traction wheels, driving connections between said hubs and said latter shaft, and means for raising the traction wheels from the ground.

3. The combination with a motor vehicle having a chassis frame, a rear axle and traction wheels, of sprocket wheels secured to the traction wheels and having hubs, a roller at the rear of said traction wheels and having a shaft, sprocket wheels on said shaft, draw bars connecting said hubs and shaft, driving chains extending around the sprocket wheels on the hubs and shaft, links depending from the chassis frame and connected to said shaft, and means for supporting the traction wheels from the chassis frame.

In testimony whereof I affix my signature.

WILLIAM H. GAILOR.